June 29, 1965
G. D. SIMONDS ETAL
3,191,708
AXLE AND DRIVE-THROUGH GEAR
Filed March 9, 1960
5 Sheets-Sheet 1
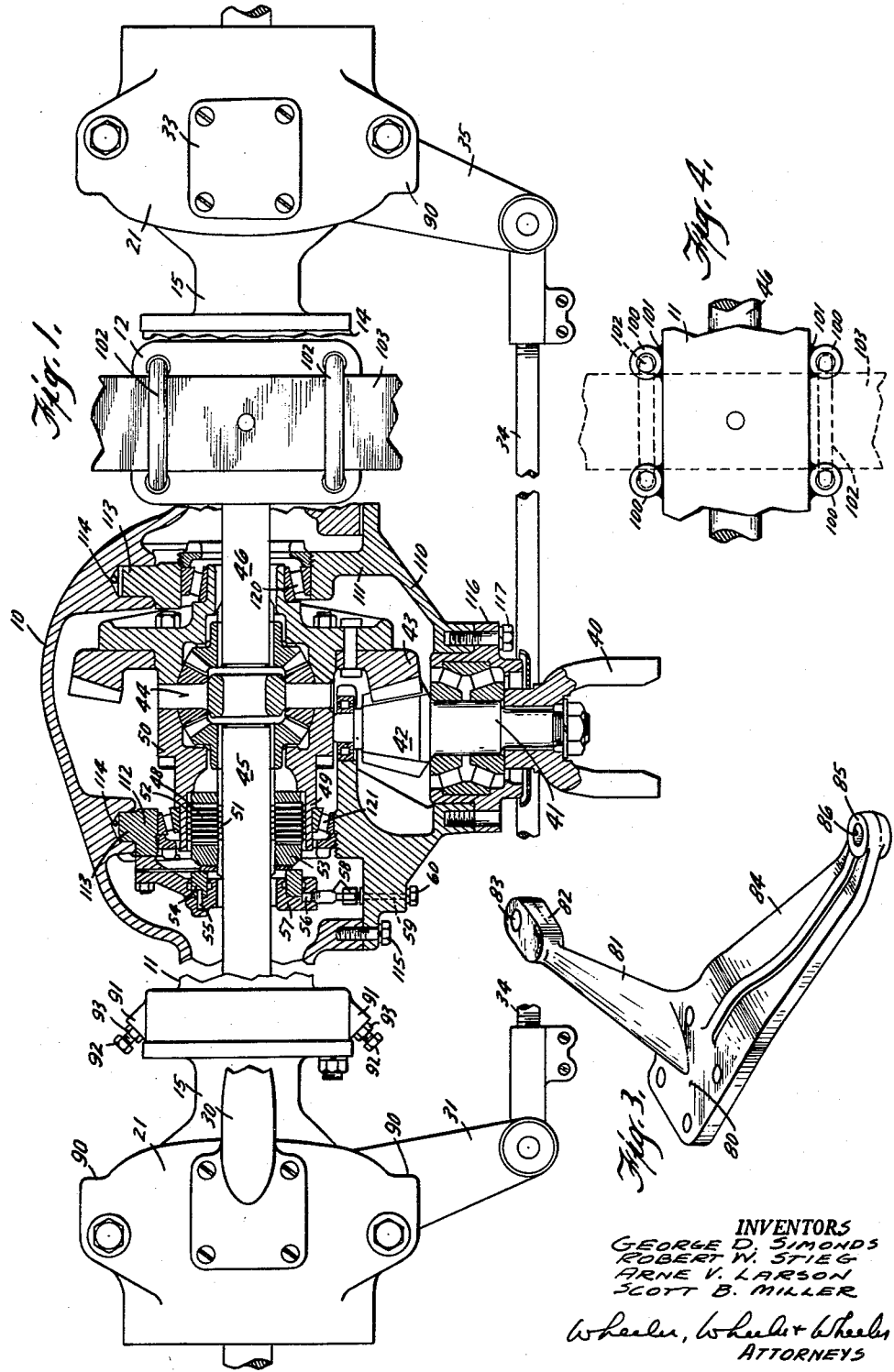
INVENTORS
GEORGE D. SIMONDS
ROBERT W. STIEG
ARNE V. LARSON
SCOTT B. MILLER
Wheeler, Wheeler & Wheeler
ATTORNEYS

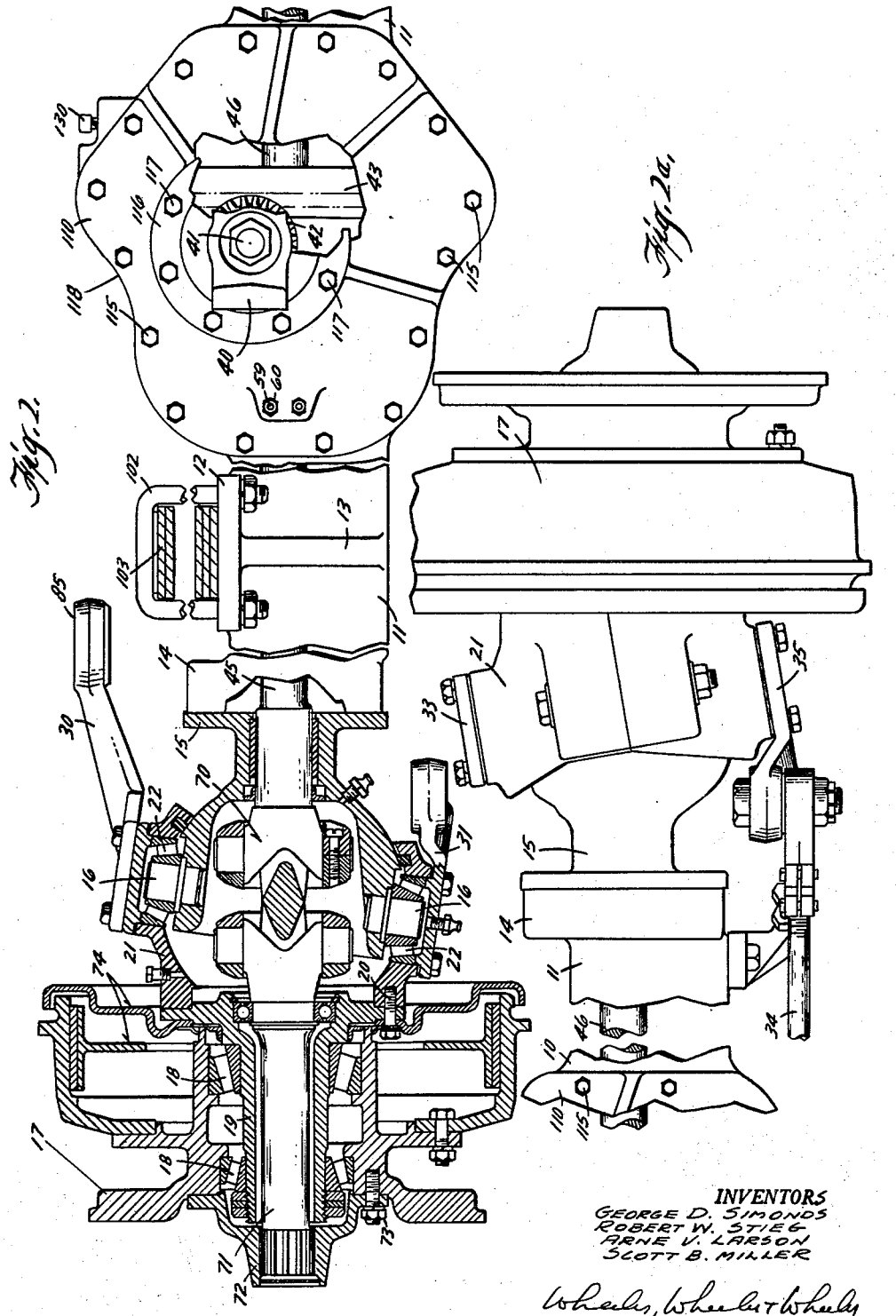

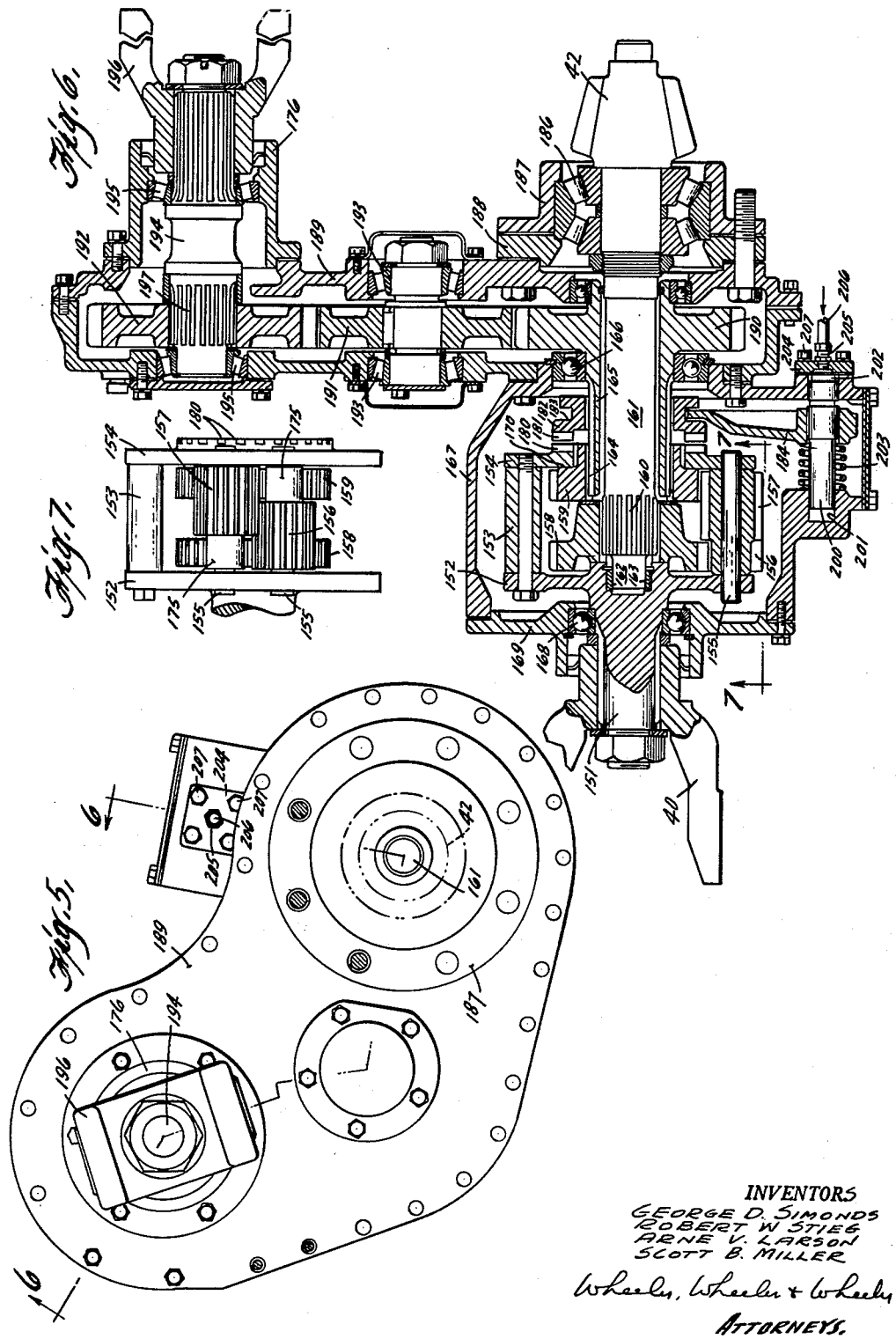

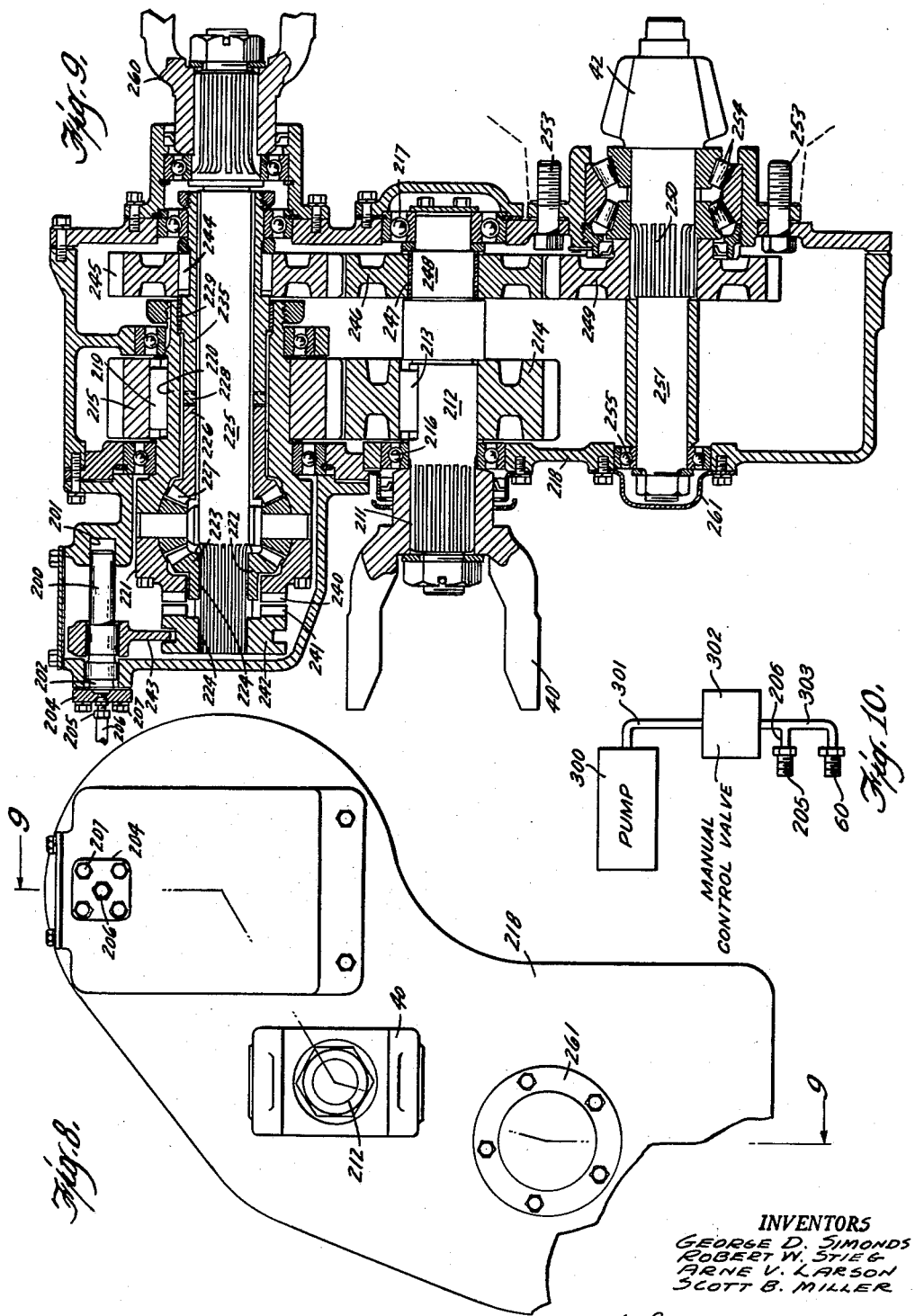

INVENTORS
GEORGE D. SIMONDS
ROBERT W. STIEG
ARNE V. LARSON
SCOTT B. MILLER

BY Wheeler, Wheeler & Wheeler
ATTORNEYS

United States Patent Office 3,191,708
Patented June 29, 1965

3,191,708
AXLE AND DRIVE-THROUGH GEAR
George D. Simonds, Robert W. Stieg, Arne V. Larson, and Scott B. Miller, all of Clintonville, Wis., assignors to FWD Corporation, Clintonville, Wis., a corporation of Wisconsin
Filed Mar. 9, 1960, Ser. No. 13,868
4 Claims. (Cl. 180—44)

This application relates to an axle and drive-through gear case for heavy duty vehicles.

An object of the invention is to provide a simple and effective differential lock which is less subject to service difficulties than previous locks.

Another object of the invention is to provide coordinated means for driving several axles.

A further object of the invention is to provide mounting means for the axle differential which are readily removable for servicing.

A further object of the invention is to provide a combination steering arm and drag link which provides for better durability of both the steering ball and the steering arm and drag link arm.

A further object of the invention comprises an improved method of attaching the spring to the axle in such a manner that the axle may be adapted for different sizes of vehicles.

A further object is to provide a novel drive pinion and ring gear arrangement which decreases the universal joint angles.

FIG. 1 is a plan view of the axle of our invention with portions of the differential housing shown in horizontal cross-sectional view.

FIG. 2 is a front view of the axle of our invention with portions of the wheel and steering ball shown in vertical cross-sectional view.

FIG. 2a is an extension of the right side of FIG. 2.

FIG. 3 is a perspective view of a modified combined steering arm and drag link arm.

FIG. 4 is a fragmentary top plan view in which a modified form of spring attachment is shown.

FIG. 5 is an elevational view looking toward the right side of the gear case as shown in FIG. 6.

FIG. 6 is a cross-sectional view on line 6—6 of FIG. 5 showing a gear case for connection to the axle to drive another axle.

FIG. 7 is a view on line 7—7 of FIG. 6 showing the differential gear set.

FIG. 8 is an elevational view looking toward the left side of the modified gear case as shown in FIG. 9.

FIG. 9 is a cross-sectional view on line 9—9 of FIG. 8 showing a modified gear case for connecting two driving axles.

FIG. 10 is a schematic view of the hydraulic system for the differential locks.

Figure 11:
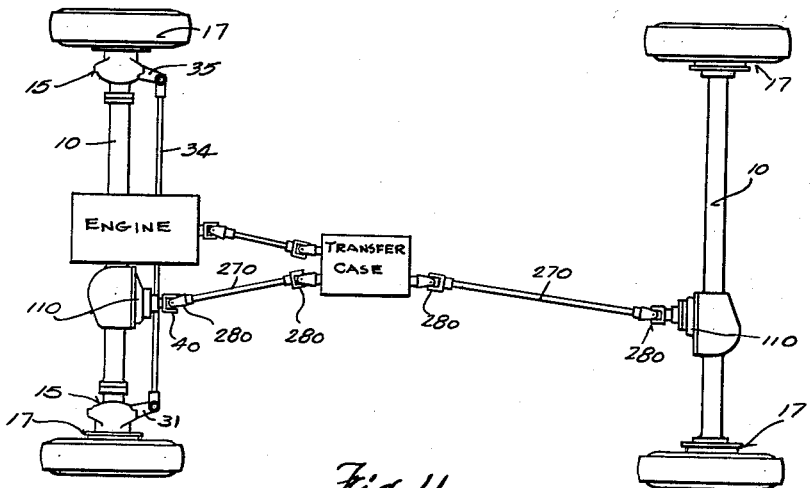
FIGS. 11 and 12 are schematic views of drive trains of vehicles, showing differential systems according to our invention.

FIGS. 1 and 2 show an axle having a cast axle housing 10, including shaft housing portions 11, upon which are provided spring mounting flanges 12 strengthened by vertical flange 13, which merges into shaft housing 11 at its lower margin and forms a T with spring mounting flange 12 at the top. A like flange may be provided at the bottom of the housing, if desired. A ball joint mounting flange 14 may be provided at the end of each shaft housing 11, to which is bolted or welded inner ball joint member 15. Member 15 is provided with kingpins 16 aligned along a generally vertical axis about which wheel 17 is pivoted for steering movement. Conventional removable rims for tires (not shown) are secured to wheel 17.

Wheel 17 is mounted on bearings 18 to hollow stub shaft 19 which has a radial flange bolted at 20 to outer steering ball member 21. Bearings 22 secure outer steering ball member 21 to kingpins 16 and thus to inner steering ball member 15. One method of accomplishing steering movement is shown in FIGS. 1 and 2, in which upper steering arm 30 is the closure member for outer steering ball member 21 over kingpin 16, and also serves to position bearing 22. Lower drag link arm 31 serves as the cover for the lower kingpin 16 and positions lower bearing 22. An upper cover and bearing positioning member 33, without a steering arm, is provided for the right hand ball member 21. The right wheel is steered by drag link 34, attached to drag link arm 31 and to drag link arm 35, which is a reversal of drag link arm 31. In the case of an axle which does not require steering, the above structure may be modified so that hollow shaft 19 is rigidly secured to housing 11, the housing being lengthened to provide the proper tread width.

Figure 12:
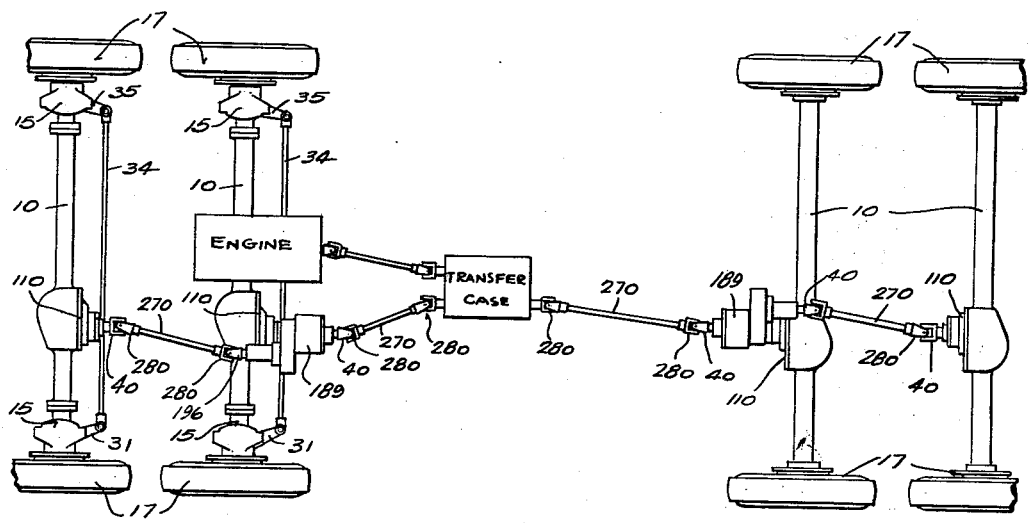

Power is transmitted through the axle beginning at yoke 40, which is a part of a conventional differential joint (not shown in full) between pinion shaft 41 and the propellor shaft to the axle (FIGS. 11 and 12). Shaft 41 carries differential drive hypoid pinion 42 which meshes with hypoid bevel ring gear 43.

A feature of our invention is that pinion 42 is above, rather than at or below, the horizontal center line of ring gear 43, which permits a smaller angle between pinion shaft 41 and the propellor shaft 270 (FIGS. 11 and 12). The angle at which the universal joints 280 (of which respective yokes 40 are parts) operate is an important factor in causing wear, particularly by causing vibration of the propellor shaft, with consequent damage to the parts associated therewith. Even though the universal joint represented by yoke 40 and the universal joint at the other end of the propellor shaft are so arranged that pinion shaft 41 is driven at constant velocity, the propellor shaft between the joints will not have constant velocity, and will vibrate rotationally in proportion to the angle at which the universal joint operates. The propellor shaft normally turns at high speed and thus undergoes large changes in rotational inertia during each revolution, which must be absorbed in part by the drive train through the axle. Thus, reduction of the angle of the universal joint is an important factor in the durability of the universal joint, differential, axle, and of the drive train to other driven axle, to be described later.

Ring gear 43 drives a conventional differential gear set 44, which in turn drives axle shafts 45 and 46.

Differential action may be prevented by means of a lockout clutch comprising interleaved discs 48, alternate discs being splined at 52 to a sleeve-like extension 49 of differential pinion cage 50, and the remaining discs being splined at axle shaft 45 at 51. Annular follower block 53 may slide axially with respect to shaft 45 on splines 51 to compress discs 48, thus linking shaft 45 to sleeve 49 of the differential cage 50 to prevent differential action. Annular piston 54 bears on block 53, and is prevented from rotating by pin 55 but is free for axial movement in response to fluid pressure supplied through channel 56 to cylinder 57. Channel 56 terminates at pressure fluid fittings 58, which connect the passage with passage 59 in axle housing 10. The hydraulic fluid is supplied at fitting 60 to the outer end of passage 59, from a conventional supply hose (not shown). Thus when fluid is applied at 60 it applies fluid pressure behind annular piston 54 to move annular block 53 to the right, as shown in FIG. 1, compressing discs 48 which are alternately splined to shaft 45 and sleeve 49 of the differential cage, preventing differential action within the limit to which the applied pressure is able to lock the discs 48. If the accumulated torque acting to cause wheels 17 to move at different speeds exceeds this locking force, differentiation, rather than breakage, will take place. In previous jaw clutch differential lockouts it was possible to break the teeth of the jaws by excessive forces generated by wheels following paths of different lengths, and it was also possible to generate sufficient tooth loads to prevent unlocking the differential.

As shown in FIG. 10, power for actuating the differential lock 48 is supplied by pump 300, which supplies fluid through passage 301, manual control valve 302, passage 303 and fitting 60 to the mechanism just described when the manual control valve is open. Branch passage 206 supplies fluid through fitting 205 to a differential lock in a drive-through gear case, described later, and shown in FIG. 6 or FIG. 9.

Shafts 45 and 46 terminate in universal joints generally designated as 70. An output shaft 71 extends outwardly from each universal joint 70 through hollow sleeves 19 and terminates in a splined connection to member 72, which is bolted at 73 to wheels 17. The brake structure, generally designated as 74, is secured by bolts 20, which also secure sleeve 19 to outer steering ball portion 21.

A relief valve 130 is provided in housing 10, to discharge excess pressure caused by expansion of the air and oil.

FIG. 3 shows an alternate form of the steering arm and drag link arm, in which a single member combines both functions. Flat portion 80 is bolted to the top opening of outer steering member 21 to replace member 30 as a closure and bearing positioning member. Extending laterally and upwardly from flat portion 80 is steering arm 81 having an end 82 which is bored, like member 30, to receive the usual connection with the steering gear of the vehicle (not shown). At right angles to steering arm 81 is drag link arm 84 which extends downwardly to the side of the steering ball and is provided with head 85 bored at 86 to receive the drag link. The drag link arm 35 at the other wheel is conventional, but may depend from the upper steering ball closure.

Opposed shoulders 90 and 91 may be provided on outer steering ball member 21 and housing flange 14, respectively, for the purpose of limiting the movement of steering ball member 21 with respect to inner steering ball member 15, to prevent the universal joint 70 from being displaced at a greater angle than is permissible. We may further provide a screw 92 which is adjustable to precisely define the point at which the steering motion of the steering ball will be stopped, and a lock nut 93 to secure screw 92 in the appropriate position.

FIG. 4 shows a unique modified spring anchor which comprises four vertical tubes 100 welded to axle shaft housing portions 11 at 101, to provide anchorage for U-bolts 102 which extend across the top of spring 103 in the same manner as is shown in FIG. 1 in connection with spring mounting flange 12. A particular feature of this construction is that spring mounting tubes 100 may be mounted at any point along housing portion 11, accommodating the axle to the needs of a wide variety of vehicles. A further feature is that the compressive load exerted by drawing up the nuts on the U-bolts is taken by the tubes in compression without distorting the axle housing. Where top and bottom flanges are provided on the axle housing to receive the U-bolts, the housing itself may be distorted where the nuts are applied.

The pinion gear 42, the differential gear set 44, and the differential lock are mounted for easy disassembly and service in housing 10 by means of a front axle housing closure member 110 provided with spaced integral differential mounting flanges 111 and 112, each of which is provided with support pins 113 engaged in bores 114 in housing 10. The differential is mounted in flanges 111 and 112 by means of bearings 120 and 121. Front cover member 110 is bolted at 115 to axle housing 10, so that with axle shafts 45 and 46 removed from the sides, the entire differential pinion and differential lock structure may be withdrawn from housing 10 by unbolting bolts 115 and removing front cover member 110, thus exposing such structure for servicing or repair. Pinion 42 may be separately removed for servicing by unbolting the pinion bearing cover 116 at 117 to remove the pinion and its associated bearings from cover 110. Thus a unit is provided which is exceptionally easy to disassemble for service.

FIGURES 5, 6 and 7 relate to an optional gear unit which may be secured to the axle above described to replace the front plate and the pinion 42, in order to provide a drive to another axle which may be similar to the described axle.

A universal joint yoke 40 receives the drive from the propeller shaft (not shown). Yoke 40 is splined and secured with a nut to input shaft 151, which terminates in flange 152. Flange 152 is a part of the differential gear set pinion cage. Spacers 153 and opposing flange 154 form the remainder of the cage for the spur gear differential. Mounted on pinion shafts 155 between flanges 152 and 154 are differential pinions 156 and 157 which respectively engage side gears 158 and 159, and which engage each other in the space between the side gears.

Side gear 158 is splined at 160 to shaft 161, which has a reduced end portion 162 received in a bearing 163 housed within the end of shaft 151. Side gear 159 is splined at 164 to sleeve 165 which is supported in bearing 166 on housing 167. Shaft 151 is supported in bearing 168 from cover-plate 169 of housing 167.

Annular flange 154 which is a part of the differential cage is provided at its inner margin with clutch teeth 180 to engage clutch teeth 181 on shifter body 182, which is provided with a groove 183 to engage shifter fork 184 and which is axially slideable on splines to engage and disengage teeth 180 and 181. In the engaged position the differential cage 152–154 is secured to sleeve 165 to prevent differential action between output shaft 161 and output sleeve 165. Differential side gear 158 is prevented from axial movement by frictional engagement with the end of shaft 151 at one end and with side gear 159 at the other end. Side gear 159 is in turn held against axial movement by engagement of radial surface 170 with annular flange 154.

Shaft 161 terminates in a pinion gear 42, above the center of the ring gear of the axle as above described. This end of shaft 161 is supported by thrust bearing 186 from end cover 187 and 188 replacing the pinion cover 116 in the axle above described. Case 189 encloses and supports a train of gears, starting with gear 190 which is integral with sleeve 165. Gears 191 and 192 complete the train. Gear 191 is an idler gear supported from case 189 by bearings 193, and gear 192 is an output gear splined at 197 to shaft 194. The shaft is supported by bearings 195 in housing 189 and terminates in an output universal joint yoke 196. A short propeller shaft terminating in another universal joint extends from yoke 196 to the input yoke 40 of a further axle (FIG. 12).

FIG. 7 is a side view of the cage and spur gear structure of the differential set, showing the relationship of the gears more clearly.

Spacers 153 are bolted between the radial annular flanges 152 and 154 to secure flange 154 to flange 152 and to provide support for differential spur gear pinions 156 and 157 which are engaged with each other at the inner ends of their respective sets of teeth, and which are engaged with side gears 158 and 159 respectively at their outward ends. Each spur pinion is provided with a shaft portion 175 which is reduced in diameter in comparison with the teeth, but which is enlarged in comparison with shaft 155, to insure maintenance of the spacing described, in which each pinion engages only one side gear.

Shifter 184 is secured to shifter rod 200. The rod is guided in bore 201 of housing 167 at one end, and in bore 202 of housing 167 at the other end. A spring 203 extends between the housing and the shifter 184 to bias it toward a position in which teeth 180 are disconnected from teeth 181. Cover 204 is secured by bolts 207 over bore 202, and is provided with hydraulic pressure fitting 205 attached to pressure fluid line 206 to supply fluid pressure to bore 202 to force shifter rod 200 to the left as viewed in FIG. 6. This causes engagement of clutch teeth 181 with teeth 180 to prevent differential action.

As may be seen in FIG. 5, sleeve 176 encloses bearing 195, supporting the output shaft 194 adjacent to yoke 196. The gear case 189 is so shaped and oriented that sleeve 176 overlies the concave curve 118 at the top of the axle housing 10, to reduce the over-all height and size of the structure and to add rigidity thereto. This in turn helps to prevent wear, by reducing the angle at which the universal joints represented by yokes 40 and 196 must operate. FIGS. 8 and 9 represent a modification of the gear case of FIGS. 5, 6 and 7, using a standard bevel gear differential which has concentric output shafts extending in the same direction, and in which the differential is driven by a pair of spur gears from the input shaft. This permits changes in the gear ratio of the drive to both axles by changing a single part of spur gears. It will be noted that either spur gear 214 or 215 may be enlarged at the expense of the other within the available space.

Yoke 40 is a standard universal joint yoke and is splined at 211 to input shaft 212, which is turn is keyed at 213 to spur gear 214 to drive spur gear 215 in a ratio which depends on the number of the teeth on the respective gears 214 and 215. Shaft 212 is supported in bearings 216 and 217 in housing 218. Gear 215 is keyed at 219 to sleeve 220 which is a part of differential bevel pinion cage 221, which is supported on sleeve 222 of side gear 223 which is splined at 224 to output shaft 225 and on sleeve 226 of side gear 227 which is splined at 228 to shaft 235. A bushing 229 further supports the far end of sleeve 220 to prevent contact with sleeve 226.

Cage 221 is provided at its outer end with clutch teeth 240 which engage teeth 241 of shifter ring 242, shifter 242 is splined at 224 to output shaft 225. Thus, when shift fork 243 moves axially to the right, as viewed in FIG. 9, teeth 240 and 241 engage and couple shaft 225 to pinion cage 221, preventing differentiation between output shaft 225 and output sleeve 226.

Output sleeve 235 is splined at 244 to spur gear 245, which drives idler gear 246 mounted on bushing 247 on reduced portion 248 of input shaft 212. Gear 246 drives gear 249, which is splined at 250 to shaft 251, which is provided with an input pinion 42 to drive the ring gear of the differential in the axle. Gear case 218 is bolted to the axle by means of bolts 253, replacing the original pinion and pinion cover plate in the axle. Thrust bearings 254 serve to accurately position the pinion shaft 251 at one end, while bearings 255 support the other end.

Output shaft 225 bears an output yoke 260 like yoke 196 described in connection with FIG. 6, which is part of a universal joint driving a propeller shaft for the next axle. Any number of successive axles may be driven in this manner, within the torque-transmitting capacity of the parts.

By reason of the spur gear drive 214 and 215 to the differential cage 221, the drive ratio of all such axles may be changed simply by substituting a pair of gears 214 and 215 having different numbers of teeth in the drive-through gear case on the first axle.

Engagement of the jaw clutch 240, 241 to prevent differentiation between output shaft 225 and 226 is accomplished as described in connection with FIGURE 6, by means of a shift fork 243 on a shifter rod 200 riding in bores 201 and 202. Bore 202 is covered by cover plate 204 secured by bolts 207 which is provided with pressure fluid fittings 205 connected to pressure fluid hose line 206 to supply fluid pressure from a conventional source, not shown, to drive shift rod 200 to the right, as seen in FIG. 9, to engage teeth 241 with teeth 240. Control is effected manually by a hand valve in the cab of the vehicle, providing a power lock under manual control, as in the case of each differential lock described herein.

As described in connection with FIG. 6, FIG. 8 shows that the gear case 218 is so arranged that the output yoke 260 is displaced horizontally and vertically from the input yoke 40 and from the input shaft 251 which lies behind cover plate 261, so that the output shaft rests in the concave curve 118 of the upper margin of the axle, as above described, to lower the height from which the propeller must descend to the input universal joint yoke 40 of the pinion shaft of the axle which is driven from universal joint yoke 260.

Thus the unit of FIGS. 8 and 9 is interchangeable with the unit FIGS. 5–7. Either unit may be used between successive axles 10 to provide an interaxle differential in the manner illustrated in FIG. 12, whether said axles are provided with steerable wheels or non-steerable wheels.

If desired, both axles and the drive-through gear case connecting them may be rotated on a transverse axis, to decrease the angle between the respective pinion shafts, propeller shafts, etc., to decrease the angles at which the universal joints operate.

We claim:

1. In a vehicle, a pair of steerable wheels, a plurality of differential gear sets, each said differential gear set comprising a plurality of output shafts, a pinion cage, and a differential lock, power operated differential lock actuating means in each said differential gear set, a manual control for said power operated differential lock actuating means, at least one said differential gear set having said output shafts respectively operatively associated with said steerable vehicle wheels, the differential lock of said last mentioned differential gear set having an adjustable pre-determined capacity to resist differentiation upon application of torque forces biased to cause differentiation, said last mentioned differential gear set being adapted to permit differentiation while in its locked condition upon application of torque in excess of said pre-determined capacity, said differential gear sets not associated with said steerable vehicle wheels being adapted to resist differentiation while in the locked condition upon application of torque in excess of said pre-determined capacity.

2. The device of claim 1 in which the differential lock of said differential gear set associated with said steerable wheels comprises a multiple disk clutch provided with a selected number of clutch disks according to said preselected capacity to resist differentiation.

3. The device of claim 1 in which said differential lock of said differential gear set associated with said steerable wheels comprises a multiple disk clutch, said power operated differential lock actuating means comprising means to apply axial pressure to said disks, said pressure being selected according to said preselected capacity to resist differentiation.

4. A differential comprising a differential housing, differential output gears, and output shafts associated with said output gears, said shafts being relatively rotatable with respect to said housing during differentiation, in combination with a disc clutch comprising discs in driving connection with said housing, interleaved discs in driving connection with a said output shaft, power operated means adapted to apply a predetermined pressure to said clutch discs, manually operated means adapted to control said power operated means whereby the application of the selected pressure to said clutch discs is under manual control of the operator, steerable wheels having driving connections to said output shafts, the number of clutch discs respectively associated with said housing and with said one output shaft being insufficient to prevent differentiating action in said differential when the maximum predetermined pressure is applied to said discs by said power operated means and said steerable wheels are not at right angles to said output shafts and said wheels have maximum frictional engagement with the surface upon which they rest.

References Cited by the Examiner

UNITED STATES PATENTS

| | | | |
|---|---|---|---|
| 1,187,710 | 6/16 | Church | 74—607 XR |
| 1,464,795 | 8/23 | Woodward | 74—710.5 |
| 1,834,354 | 12/31 | Sluder | 180—43 |
| 2,132,545 | 10/38 | Smith | 180—43 |
| 2,133,652 | 10/38 | Best | 180—43 |
| 2,228,581 | 1/41 | Olen | 74—710.5 |
| 2,273,336 | 2/42 | Spatta | 74—607 |
| 2,346,175 | 4/44 | Matson | 74—710.5 XR |
| 2,392,832 | 1/46 | Buckendale | 180—44 |
| 2,467,605 | 4/49 | Urschel | 74—607 |
| 2,477,090 | 7/49 | Roeder et al. | 180—43 |
| 2,510,996 | 6/50 | Morgan | 74—713 |
| 2,561,335 | 6/51 | Buckendale | 74—713 |
| 2,679,769 | 6/54 | Parrett | 74—710.5 |
| 2,805,586 | 9/57 | Lucas | 74—665 |
| 2,870,853 | 1/59 | Keese | 74—710.5 XR |
| 2,875,644 | 3/59 | Mancini | 74—665 |
| 2,883,026 | 4/59 | Banker | 74—710.5 XR |
| 2,913,928 | 11/59 | Double | 74—710.5 |
| 2,965,181 | 12/60 | Senkowski | 74—710.5 XR |
| 3,000,456 | 9/61 | Christie | 74—713 XR |

DON A. WAITE, *Primary Examiner.*

BROUGHTON G. DURHAM, *Examiner.*